United States Patent
Cao

(10) Patent No.: US 11,776,170 B2
(45) Date of Patent: Oct. 3, 2023

(54) SYSTEMS AND METHODS FOR MEDICAL IMAGING

(71) Applicant: SHANGHAI UNITED IMAGING HEALTHCARE CO., LTD., Shanghai (CN)

(72) Inventor: Wenjing Cao, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 281 days.

(21) Appl. No.: 17/082,128

(22) Filed: Oct. 28, 2020

(65) Prior Publication Data

US 2021/0049795 A1    Feb. 18, 2021

(30) Foreign Application Priority Data

Oct. 29, 2019 (CN) .......................... 201911040232.9

(51) Int. Cl.
  *G06T 11/00*  (2006.01)
  *G06T 7/11*   (2017.01)
  *G06T 7/20*   (2017.01)

(52) U.S. Cl.
  CPC .............. *G06T 11/005* (2013.01); *G06T 7/11* (2017.01); *G06T 7/20* (2013.01); *G06T 2207/10081* (2013.01); *G06T 2210/41* (2013.01)

(58) Field of Classification Search
  CPC . G06T 7/11; G06T 7/20; G06T 11/005; G06T 11/006; G06T 2207/10081;

(Continued)

(56) References Cited

U.S. PATENT DOCUMENTS

2011/0228999 A1* 9/2011 Hsieh .................. A61B 6/037
                                                             382/131
2011/0286573 A1* 11/2011 Schretter ............. A61B 6/4085
                                                             378/4

(Continued)

FOREIGN PATENT DOCUMENTS

CN    102737392 A    10/2012
CN    103810733 A     5/2014

(Continued)

OTHER PUBLICATIONS

Vaegler et al. "Incorporation of local dependent reliability information into the prior image constrained compressed sensing (PICCS) reconstruction algorithm." Zeitschrift für Medizinische Physik 25.4 (2015): 375-390. (Year: 2015).*

(Continued)

*Primary Examiner* — Katrina R Fujita
(74) *Attorney, Agent, or Firm* — METIS IP LLC

(57) ABSTRACT

The present disclosure relates to systems and methods for medical imaging. The method may include obtain scanning data and at least one prior image of a subject. The method may include determining a restriction factor for each of the at least one prior image based on the scanning data. The restriction factor of the each prior image may relate to a motion of the subject corresponding to the scanning data. The method may include determining an objective function based on the restriction factor. The method may also include reconstructing, using the objective function, a target image of the subject based on the scanning data and the at least one prior image.

20 Claims, 9 Drawing Sheets

(58) Field of Classification Search
CPC ........... G06T 2210/41; G06T 2211/412; G06T 2211/424; G06T 2211/436
See application file for complete search history.

(56) References Cited

U.S. PATENT DOCUMENTS

| | | | |
|---|---|---|---|
| 2015/0187052 | A1 | 7/2015 | Amroabadi et al. |
| 2018/0018796 | A1 | 1/2018 | Chen et al. |
| 2018/0040145 | A1* | 2/2018 | Matthews ............ A61B 6/0407 |
| 2019/0188885 | A1* | 6/2019 | Grass ................... A61B 6/5252 |
| 2022/0051416 | A1* | 2/2022 | Cao ......................... G06T 7/215 |

FOREIGN PATENT DOCUMENTS

| | | |
|---|---|---|
| CN | 109523602 A | 3/2019 |
| WO | 2018060106 A1 | 4/2018 |

OTHER PUBLICATIONS

Lauzier et al. "Time-resolved cardiac interventional cone-beam CT reconstruction from fully truncated projections using the prior image constrained compressed sensing (PICCS) algorithm." Physics in Medicine & Biology 57.9 (2012): 2461. (Year: 2012).*

Tang et al. "Temporal resolution improvement in cardiac CT using PICCS (TRI-PICCS): Performance studies." Medical physics 37.8 (2010): 4377-4388. (Year: 2010).*

Lee et al. "Improved compressed sensing-based cone-beam CT reconstruction using adaptive prior image constraints." Physics in medicine & biology 57.8 (2012): 2287. (Year: 2012).*

Kim et al. "Cardiac motion correction based on partial angle reconstructed images in x-ray CT." Medical physics 42.5 (2015): 2560-2571. (Year: 2015).*

Hahn et al. "Motion compensation in the region of the coronary arteries based on partial angle reconstructions from short-scan CT data." Medical physics 44.11 (2017): 5795-5813. (Year: 2017).*

Flohr et al. "Heart rate adaptive optimization of spatial and temporal resolution for electrocardiogram-gated multislice spiral CT of the heart." Journal of computer assisted tomography 25.6 (2001): 907-923. (Year: 2001).*

Lauzier, Pascal Theriault, Jie Tang, and Guang-Hong Chen. "Prior image constrained compressed sensing: Implementation and performance evaluation." Medical physics 39.1 (2011): 66-80. (Year: 2011).*

* cited by examiner

SYSTEMS AND METHODS FOR MEDICAL IMAGING

CROSS-REFERENCE TO RELATED APPLICATIONS

This application claims priority to Chinese Application No. 201911040232.9, filed on Oct. 29, 2019, the contents of which are hereby incorporated by reference.

TECHNICAL FIELD

The present disclosure generally relates to medical imaging, and in particular, to methods, systems, devices, and storage medium for image reconstruction.

BACKGROUND

Medical imaging techniques (e.g., magnetic resonance imaging (MRI), positron emission tomography (PET), computed tomography (CT), single-photon emission computed tomography (SPECT) are widely used in clinical diagnosis and/or treatment.

SUMMARY

According to one aspect of the present disclosure, a system is provided. The system may include at least one storage device including a set of instructions, and at least one processor configured to communicate with the at least one storage device. When executing the set of instructions, the at least one processor may be configured to direct the system to perform operations. The at least one processor may be configured to direct the system to obtain scanning data and at least one prior image of a subject. The at least one processor may be configured to direct the system to determine a restriction factor for each of the at least one prior image based on the scanning data. The restriction factor of the each prior image may relate to a motion of the subject corresponding to the scanning data. The at least one processor may be configured to direct the system to determine an objective function based on the restriction factor. The at least one processor may be configured to direct the system to reconstruct, using the objective function, a target image of the subject based on the scanning data and the at least one prior image.

In some embodiments, each of the at least one prior image may be acquired from one first scanning angle range of a computed tomography (CT) scanner, the scanning data may be acquired from a second scanning angle range of the CT scanner, and at least one of the at least one first scanning angle range may exceed the second scanning angle range.

In some embodiments, the determining a restriction factor for each of the at least one prior image based on the scanning data may include generating a primary image of the subject based on the scanning data; determining a mask matrix based on the primary image; and determining the restriction factor for the each of the at least one prior image based on the mask matrix.

In some embodiments, the determining a mask matrix based on the primary image may include: determining at least one first region and at least one second region by segmenting the primary image, the at least one first region and the at least one second region forming the subject; identifying, in the at least one second region, at least one transition region; obtaining a primary mask matrix, wherein the primary mask matrix includes a plurality of mask elements, and each of the plurality of mask elements corresponds to at least one pixel or voxel of the primary image; updating the primary mask matrix by a process including: assigning first values to mask elements of the primary mask matrix that correspond to the at least one first region of the primary image; assigning second values to mask elements of the primary mask matrix that correspond to a remaining portion of the at least one second region other than the at least one transition region of the primary image; and assigning third values to mask elements of the primary mask matrix that correspond to the at least one transition region of the primary image; and designating the updated primary mask matrix as the mask matrix.

In some embodiments, the first values, the second values, and the third values may range from 0 to 1.

In some embodiments, the at least one first region may correspond to a first motion degree, the at least one second region may correspond to a second motion degree, the at least one transition region may correspond to a third motion degree, and both the first motion degree and the third motion degree may exceed the second motion degree.

In some embodiments, the restriction factor for one of the at least one prior image may include a plurality of restriction elements, each of the plurality of restriction elements may correspond to at least one pixel or voxel of the prior image.

In some embodiments, the determining a restriction factor for each of the at least one prior image based on the scanning data may include: obtaining second scanning data of the subject; determining motion characteristics of the subject based on the first scanning data and the second scanning data; and determining the restriction factor for the each of the at least one prior image based on the motion characteristics of the subject.

In some embodiments, the scanning data may correspond to a first motion phase of the motion of the subject, the second scanning data may correspond to a second motion phase of the motion of the subject, and the first motion phase and the second motion phase may be different.

In some embodiment, the first motion phase and the second motion phase may be consecutive to each other.

In some embodiments, the motion characteristics of the subject may be represented by a motion vector field of the subject.

In some embodiments, the at least one prior image of the subject may include a first prior image of a first temporal resolution and a second prior image of a second temporal resolution, and the first temporal resolution may be different from the second temporal resolution.

According to another aspect of the present disclosure, a method is provided. The method may include obtaining scanning data and at least one prior image of a subject. The method may include determining a restriction factor for each of the at least one prior image based on the scanning data. The restriction factor of the each prior image relating to a motion of the subject corresponding to the scanning data. The method may include determining an objective function based on the restriction factor. The method may also include reconstructing, using the objective function, a target image of the subject based on the scanning data and the at least one prior image.

According to another aspect of the present disclosure, a non-transitory computer-readable storage medium including instructions is provided. When accessed by at least one processor of a method, the instructions cause the system to perform a method. The method may include obtaining scanning data and at least one prior image of a subject. The method may include determining a restriction factor for each of the at least one prior image based on the scanning data. The restriction factor of the each prior image relating to a motion of the subject corresponding to the scanning data. The method may include determining an objective function based on the restriction factor. The method may include reconstructing, using the objective function, a target image of the subject based on the scanning data and the at least one prior image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Figure 2:
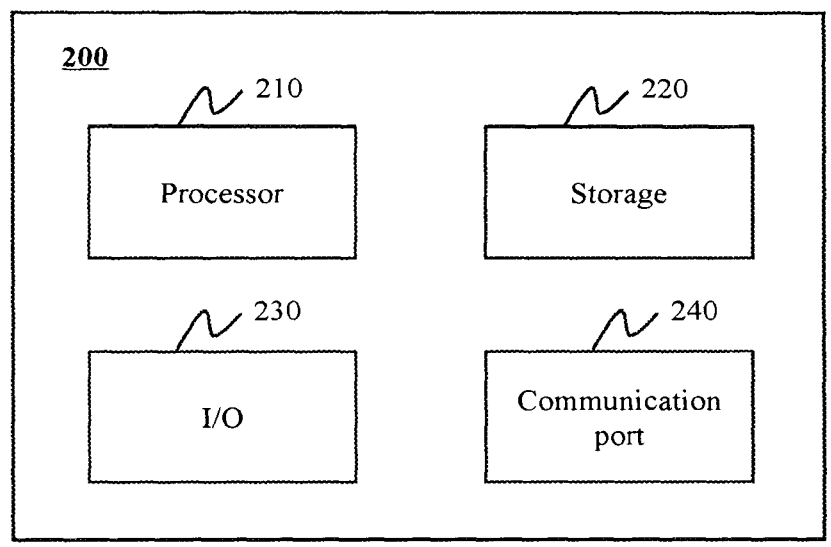
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

Provided herein are systems and methods for imaging. In some embodiments, the imaging system may include a single modality system and/or a multi-modality system. The term "modality" used herein broadly refers to an imaging or treatment method or technology that gathers, generates, processes, and/or analyzes imaging and/or treatment information of a subject. The single modality system may include a computer tomography (CT) system, a computer radiography (CR) system, a digital radiography (DR) system, a computer tomography (CT) system, an X-ray system, a mobile X-ray system (such as mobile C-arm system), a digital subtraction angiography (DSA) system, an emission computed tomography (ECT) system, a positron emission tomography (PET) system, a single-photon emission computed tomography (SPECT) system, a magnetic resonance imaging (MRI) system, an ultrasound imaging system, etc. The multi-modality system may include a CT-MRI system, a PET-CT system, a SPECT-MRI system, a PET-ECT system, a PET-MRI system, a digital subtraction angiography-magnetic resonance imaging (DSA-MRI) system. Merely for illustration purposes, the following descriptions are provided, unless otherwise stated expressly, with reference to a CT system, which is not intended to be limiting. In the present disclosure, the term "image" used in this disclosure may refer to a two-dimensional (2D) image, a three-dimensional (3D) image, or a four-dimensional (4D) image. In some embodiments, the term "image" may refer to an image of a region, e.g., a region of interest (ROI), of a patient. The term "region of interest" or "ROI" used in this disclosure may refer to a part of an image along a line, in two spatial dimensions, in three spatial dimensions, or any of the proceeding as they evolve as a function of time. These are not intended to limit the scope of the present disclosure. For persons having ordinary skills in the art, a certain number of variations, changes, and/or modifications may be deduced under the guidance of the present disclosure. Those variations, changes, and/or modifications do not depart from the scope of the present disclosure.

In a computed tomography (CT) imaging process, scanning of a subject performed within a relatively small scanning angle range may be fast in terms of the scanning time and image reconstruction time with improved temporal resolution and reduced motion artifact. The radiation dose of the subject exposed to in the scanning may be relatively low due to the short scanning time. At the same time, the scanning data acquired in such a scanning may be insufficient, compared to a scan performed within a large scanning angle range, causing reduced image quality including, e.g., insufficient details of the subject in an image obtained based on the scanning data. In this connection, a prior image of the subject corresponding to a relatively large scanning angle range may be provided to supplement details for a target image to be reconstructed based on scanning data of the subject. However, a globally uniform application of the prior image in the reconstruction process of the target image may degrade a temporal resolution of the target image due to an uneven motion distribution in the subject, and/or result in motion artifacts such as motion blur in various regions (e.g., coronary arteries) of the subject. The temporal resolution of the prior image may be low since the large scanning angle range. Thus, it is desirable to provide efficient systems and methods for reconstructing images with improved temporal resolution and improved image quality.

An aspect of the present disclosure relates to systems and methods for medical imaging. The system may obtain scanning data of a subject acquired in a scan performed within a small scanning angle range and at least one prior image of the subject acquired in a prior scan performed within a large scanning angle range. The at least one prior image may include more details of the subject. The at least one prior image may be used as a supplement in the reconstruction of a target image of the subject based on the scanning data so as to enrich details in the target image and improve image quality of the target image. However, the prior image may have a poor temporal resolution due to the large scanning angle range. The system may determine a restriction factor (e.g., a matrix including a plurality of restriction elements) for each of the at least one prior image. The restriction factor of a prior image may reflect the extent to which the information of pixels or voxels of a prior image may impact the target image.

Merely for illustration, the restriction factor may distinguish different regions in a reconstructed image (e.g., a primary image) of the subject of different motion intensities (e.g., represented by their respective motion degrees). Different regions of the restriction factor may be assigned with different restriction elements based on the motion intensities or degrees of the regions. A prior image, or a portion thereof, may be used as a supplement, according to the restriction factor, with respect to a target image in regions corresponding to portions of the subject of substantially no motion or low motion degrees (e.g., the nose of a patient). The regions of the target image corresponding to portions of the subject of substantially no motion or low motion degrees may be reconstructed based at least in part on the prior image. The prior image, or a portion thereof, may be restricted from being used (not used) as a supplement, according to the restriction factor, with respect to the target image in regions corresponding to portions of the subject of large motion degrees (e.g., coronary arteries of the heart of the patient). A motion region of the target image of the subject may be reconstructed based on the scanning data. In this way, the target image may have both a high temporal resolution in the motion region(s) and sufficient details in the static region(s) so that the overall quality of the target image and the imaging efficiency may be improved.

As used herein, a static region of an image of a subject refers to a region of the image that corresponds to a portion of the subject of substantially no motion (or referred to as a static portion of the subject for brevity). As used herein, a motion region of an image of a subject refers to a region of the image that corresponds to a portion of the subject of a high motion degree or intensity (or referred to as a high motion portion of the subject for brevity). As used herein, a transition region of an image of a subject refers to a region of the image that corresponds to a portion of the subject of a moderate motion degree of intensity falling between substantially no motion and a high motion degree or intensity (or referred to as a moderate moving portion of the subject for brevity). A transition region of the image is a region transitioning from a static region to a motion region of the image. As used herein, the motion degree or intensity of a portion of a subject is assessed taking into consideration of the subject to be imaged and the specific imaging technique involved. A static region of an image of a subject may be substantially free of motion artifact. A transition region of an image of a subject may be susceptible to motion artifact to a less extent than a motion region of the image of the subject, but to a larger extent than a static region of the image of the subject.

Figure 1:
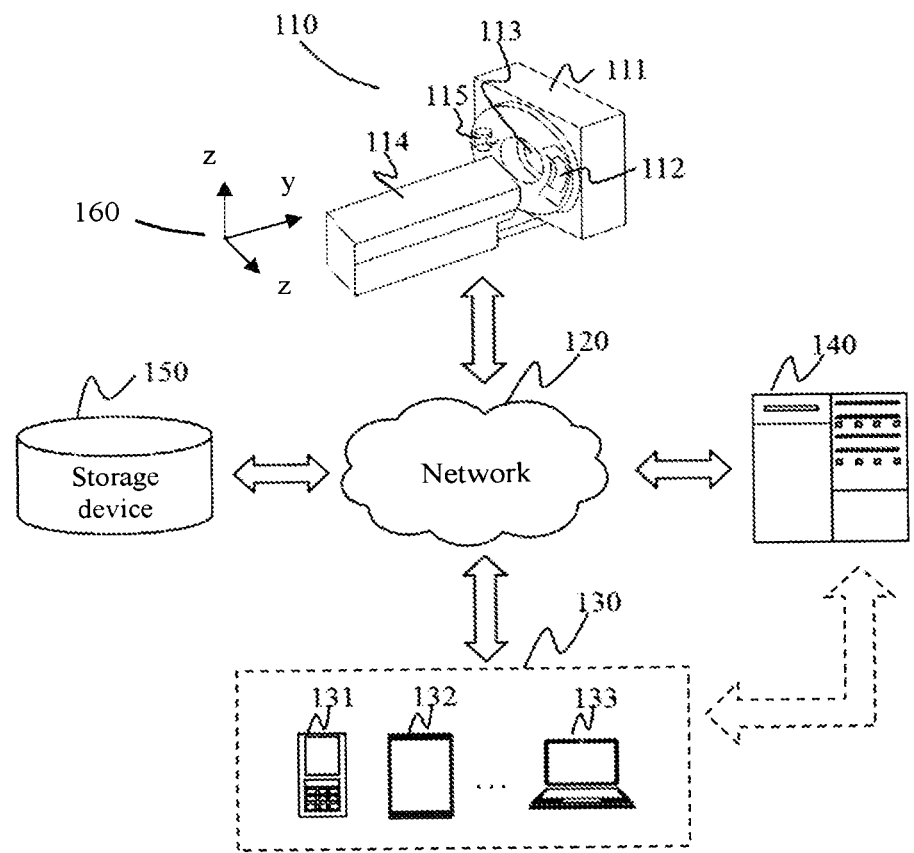
FIG. 1 is a schematic diagram illustrating an exemplary imaging system according to some embodiments of the present disclosure.

FIG. 1 is a schematic diagram illustrating an exemplary imaging system according to some embodiments of the present disclosure. This is understood that the systems and methods for medical imaging are also applicable in other systems, e.g., an industrial non-destructive inspection system. As illustrated in FIG. 1, the imaging system 100 may include a scanner 110, a network 120, one or more terminals 130, a processing device 140, and a storage device 150. In some embodiments, the imaging system 100 may obtain scanning data of a subject (e.g., by scanning the subject using the scanner 110) and reconstruct an image of the subject based on the scanning data. In some embodiments, two or more components of the imaging system 100 may be connected to and/or communicate with each other via a wireless connection, a wired connection, or a combination thereof. The connection among the components of the imaging system 100 may be variable. Merely by way of example, the scanner 110 may be connected to the processing device 140 through the network 120 or directly. As another example, the storage device 150 may be connected to the processing device 140 through the network 120 or directly.

The scanner 110 may scan a subject, or a portion thereof, that is located within its detection region and generate scanning data/signals relating to the (portion of) subject. The scanner 110 may include a gantry 111, a detector 112, a detection region 113, a scanning couch 114, and a radiation source 115. The gantry 111 may support the detector 112 and the radiation source 115. The gantry 111 may rotate, for example, clockwise or counterclockwise, about an axis of rotation of the scanner 110. The radiation source 115 may rotate together with the gantry 111. The subject may be placed on the scanning couch 114 to be scanned. The radiation source 115 may emit a radiation beam (e.g., an X-ray beam) to the subject. The detector 112 may detect the radiation beam emitted from the detection region 113. In some embodiments, the detector 112 may include one or more detector units. The detector unit(s) may be and/or include single-row detector elements and/or multi-row detector elements. The detector 112 may convert the detected radiation beam into electric signals. The electric signals may further be converted to scanning data by, for example, an analog/digital (AD) converter. The scanning data may be transmitted to a computing device (e.g., the processing device 140) for processing, and/or transmitted to a storage device (e.g., the storage device 150) for storage.

For illustration purposes, a coordinate system 160 is provided in FIG. 1. The coordinate system 160 may be a Cartesian system including an X-axis, a Y-axis, and a Z-axis. The X-axis and the Y-axis shown in FIG. 1 may be horizontal and the Z-axis may be vertical. As illustrated, the positive X direction along the X-axis may be from the left side to the right side of the scanning couch 114 viewed from the direction facing the front of the scanner 110; the positive Y direction along the Y-axis shown in FIG. 1 may be from the end to the head of the scanning couch 114; the positive Z direction along the Z-axis shown in FIG. 1 may be from the lower part to the upper part of the scanner 110.

The network 120 may include any suitable network capable of facilitating the exchange of information and/or data of the imaging system 100. In some embodiments, one or more components (e.g., the scanner 110, the terminal 130, the processing device 140, the storage device 150, etc.,) of the imaging system 100 may communicate with one or more components of the imaging system 100 via the network 120. The network 120 may be and/or include a public network (e.g., the Internet), a private network (e.g., a local area network (LAN), a wide area network (WAN)), a wired network (e.g., an Ethernet), a wireless network (e.g., an 802.11 network, a wireless Wi-Fi network), a cellular network (e.g., a Long Term Evolution (LTE) network, 4G network, 5G network, a frame relay network, a virtual private network (VPN), a satellite network, a telephone network, routers, hubs, switches, server computers, and/or any combination thereof. Merely by way of example, the network 120 may include a wired network, an optical fiber network, a telecommunication network, a local area network, a wireless local area network (WLAN), a metropolitan area network (MAN), a public switched telephone network (PSTN), a Bluetooth™ network, a ZigBee™ network, and near field communication (NFC) network and other one or a combination of them. In some embodiments, the network 120 may include one or more network access points. For example, the network 120 may include wired and/or wireless network access points, such as base stations and/or Internet exchange points through which one or more components of the imaging system 100 may be connected to the network 120 to exchange data and/or information.

The terminal(s) 130 may input/output signals, data, information, etc. The terminal(s) 130 may include a mobile device 131, a tablet computer 132, a notebook computer 133, or the like, or any combination thereof. In some embodiments, the terminal 130 may interact with other components in the imaging system 100 through a network. For example, the terminal 130 may send one or more control instructions to the scanner 110 to cause the scanner 110 to scan the subject. As another example, the terminal 130 may receive and display processing results of the processing device 140, for example, a reconstructed image. In some embodiments, the mobile device 131 may include a smart home device, a wearable device, a mobile device, a virtual reality device, an augmented reality device, or the like, or any combination thereof. In some embodiments, the smart home device may include a smart electrical appliance control device, a smart monitoring device, a smart TV, a smart camera, a walkie-talkie, or the like, or any combination thereof. In some embodiments, the wearable device may include bracelets, footwear, glasses, helmets, watches, clothes, backpacks, smart accessories, or the like, or any combination thereof. In some embodiments, the mobile device may include a mobile phone, a personal digital assistant (PDA), a POS device, a notebook computer, a tablet computer, a desktop computer, or the like, or any combination thereof. In some embodiments, the virtual reality device and/or the augmented reality device may include a virtual reality helmet, virtual reality glasses, virtual reality patch, augmented reality helmet, augmented reality glasses, augmented reality patch, etc. or any combination thereof. For example, the virtual reality device and/or augmented reality device may include Google Glass™, Oculus Rift™, HoloLens™, Gear VR™ or the like. In some embodiments, the terminal 130 may be part of the processing device 140. In some embodiments, the terminal 130 may be integrated with the processing device 140 as an operating station of the scanner 110. A user/operator (for example, a doctor) of the imaging system 100 may control the operation of the scanner 110 through the console and obtain a reconstructed image after the subject is scanned.

The processing device 140 may process data and/or information. The data and/or information may be obtained from the scanner 110, or retrieved from the terminal 130, the storage device 150, and/or an external device (e.g., a cloud data center, a cloud server). For example, the processing device 140 may obtain scanning data and at least one prior image of a subject, and reconstruct an image of the subject based on the scanning data and the prior image. In some embodiments, the processing device 140 may be a single server or a server group. The server group can be centralized or distributed. In some embodiments, the processing device 140 may be local or remote. For example, the processing device 140 may access information and/or data from the scanner 110, the terminal 130, and/or the storage device 150 via the network 120. As another example, the processing device 140 may be directly connected to the scanner 110, the terminal 130, and/or the storage device 150 to access information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2.

The storage device 150 may store data (for example, scanning data of a target object), instructions, and/or any other information. In some embodiments, the storage device 150 may store data obtained from the scanner 110, the terminal 130, and/or the processing device 140. For example, the storage device 150 may store the scanning data of the target object obtained from the scanner 110. In some embodiments, the storage device 150 may store data and/or instructions that may be executed or used by the processing device 140 to perform the exemplary methods described in the present disclosure. In some embodiments, the storage device 150 may include a mass storage device, a removable storage device, a volatile read-write memory, a read-only memory (ROM), or the like, or any combination thereof. Exemplary mass storage may include a magnetic disk, an optical disk, a solid-state drive, a mobile storage, etc. Exemplary removable storage may include a flash drive, a floppy disk, an optical disk, a memory card, a ZIP disk, a magnetic tape, etc. Exemplary volatile read-write memory may include random access memory (RAM). Exemplary RAM can include a dynamic random access memory (DRAM), a double data rate synchronous dynamic random access memory (DDR-SDRAM), static random access memory (SRAM), a thyristor random access memory (T-RAM), and a zero capacitance random access memory Access memory (Z-RAM), etc. Exemplary ROM can include mask read only memory (MROM), a programmable read only memory (PROM), an erasable programmable read only memory (EPROM), an electrically erasable programmable read only memory (EEPROM), a compact disk ROM (CD-ROM), and a digital versatile disc ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components (e.g., the processing device 140, the terminal 130, etc.,) of the imaging system 100. One or more components of the imaging system 100 may access the data or instructions stored in the storage device 150 via the network 120. In some embodiments, the storage device 150 may be directly connected to or communicate with one or more other components (e.g., the processing device 140, the terminal 130) of the imaging system 100. In some embodiments, the storage device 150 may be part of the processing device 140.

It should be noted that the above description regarding the imaging system 100 is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging system 100 may include one or more additional components and/or one or more components of the imaging system 100 described above may be omitted. In some embodiments, a component of the imaging system 100 may be implemented on two or more sub-components. Two or more components of the imaging system 100 may be integrated into a single component.

FIG. 2 is a schematic diagram illustrating exemplary hardware and/or software components of an exemplary computing device according to some embodiments of the present disclosure. The computing device 200 may be configured to implement any component of the imaging system 100. For example, the scanner 110, terminal(s) 130, the processing device 140 and/or the storage device 150 may be implemented on the computing device 200. Although only one such computing device is shown for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal(s) 130 and/or the storage device 150. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanner 110, the terminal(s) 130, the storage device 150, or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, a camera capturing gestures, or the like, or any combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 120) to facilitate data communications. The communication port 240 may establish connections between the processing device 140 and the scanner 110, the terminal(s) 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
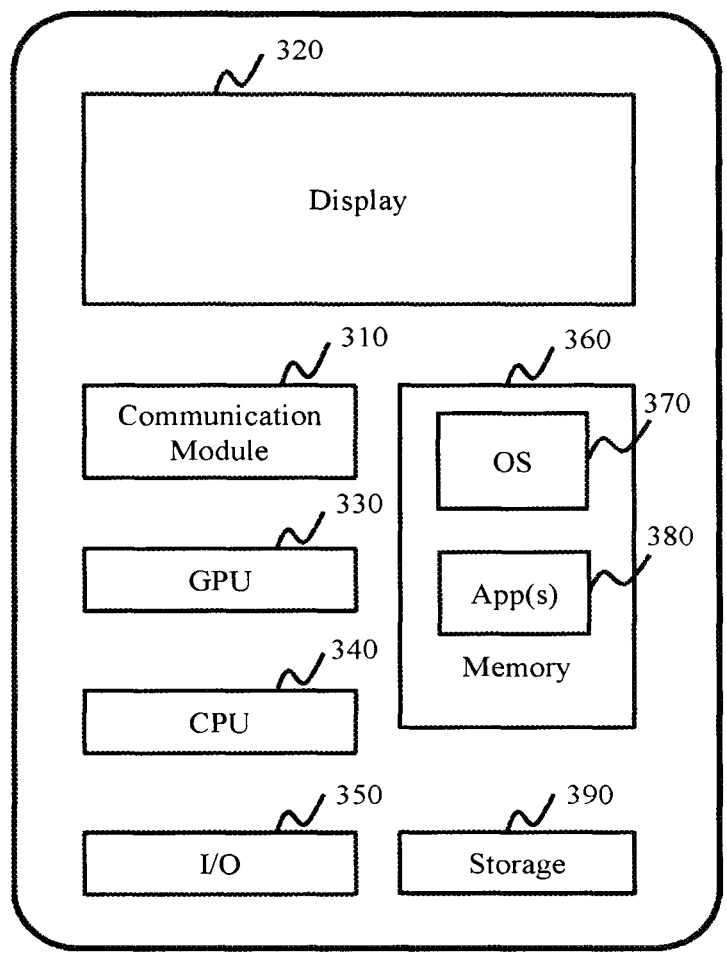
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 140 or the terminal(s) 130 may be implemented on the mobile device 300. As illustrated in FIG. 3, the mobile device 300 may include a communication module 310, a display 320, a graphics processing unit (GPU) 330, a central processing unit (CPU) 340, an I/O 350, a memory 360, and a storage 390. The CPU 340 may include interface circuits and processing circuits similar to the processor 210. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to imaging from the imaging system on the mobile device 300. User interactions with the information stream may be achieved via the I/O devices 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal. A computer may also act as a server if appropriately programmed.

Figure 4:
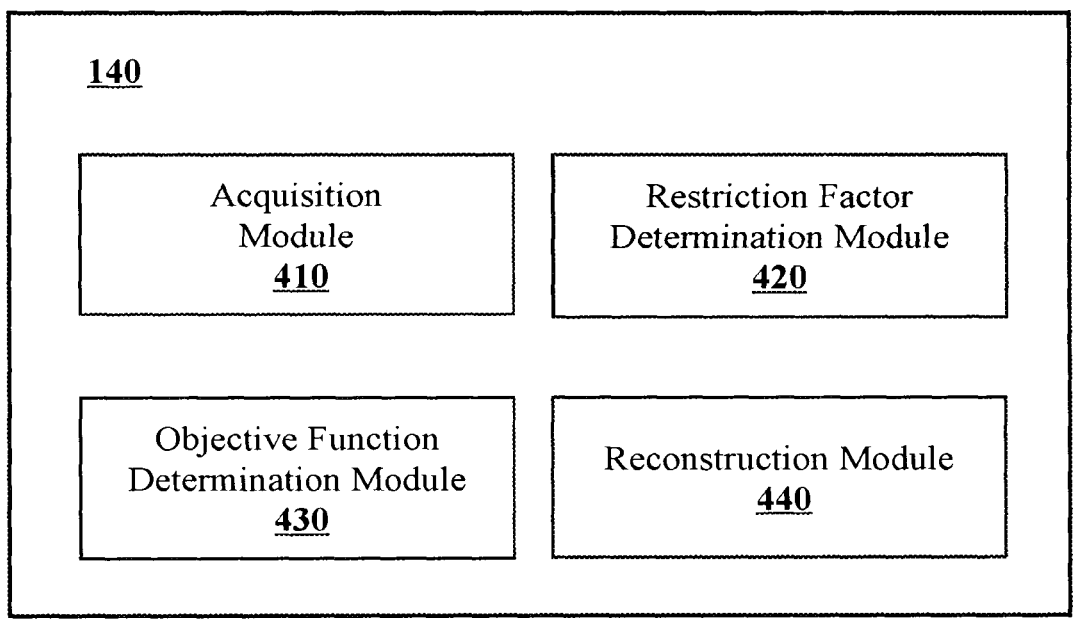
FIG. 4 is a block diagram illustrating an exemplary processing device according to some embodiments of the present disclosure.

FIG. 4 is a block diagram illustrating an exemplary processing device according to some embodiments of the present disclosure. As shown in FIG. 4, the processing device 140 may include an obtaining module 410, a restriction factor determination module 420, an objective function determination module 430, and a reconstruction module 440.

The obtaining module 410 may obtain data and/or information. The obtaining module 410 may obtain data and/or information from the scanner 110, the terminal(s) 130, the processing device 140, the storage device 150, or any devices or components capable of storing data via the network 120. For example, the obtaining module 410 may obtain data and/or information from a medical cloud data center (not shown) via the network 120. The obtained data and/or information may include scanning data and at least one prior image of a subject. In some embodiments, the scanning data may refer to projection data of the subject. In some embodiments, the projection data may include raw data obtained from the scanner 110 (e.g., the detector 112). In some embodiments, the scanning data may be obtained from one or more scanning angles of the scanner 110.

The at least one prior image of the subject may be image(s) reconstructed based on reference data of the subject. The reference data may be projection data obtained from the scanner 110. The reference data may correspond to a reference scanning angle range of the scanner 110. In some embodiments, the reference scanning angle range may exceed the scanning angle range corresponding to the scanning data.

The restriction factor determination module 420 may determine a restriction factor for a prior image. In some embodiments, the restriction factor may be a map. In some embodiments, the restriction factor determination module 420 may determine the restriction factor for the prior image based on the scanning data. The restriction factor may relate to a motion of the subject. The restriction factor may modulate the restriction of the prior image in the reconstruction of the target image. In some embodiment, the restriction factor may be a matrix, a vector, etc. In some embodiments, the restriction factor may include a plurality of restriction elements. Each of plurality of restriction element may be a restriction factor or element. In some embodiments, each of the plurality of restriction element may correspond to at least one element in the prior image. As used herein, an element of an image refers to a pixel or a voxel of the image. In some embodiments, the processing device 140 may identify one or more portions of the subject with motion degrees below a motion degree threshold, and apply corresponding portions of the prior image to the reconstruction of the target image according to the restriction factor. In this process, the restriction factor determination module 420 may also identify one or more portions of the subject with motion degrees exceeding the motion degree threshold, and may restrict the application of corresponding regions of the prior image in the reconstruction of the target image according to the restriction factor. In some embodiments, the restriction factor may be determined based on a mask matrix. The mask matrix may be determined based on an image (e.g., a primary image) of the subject. In some embodiments, the restriction factor may be determined based on motion characteristics (e.g., motion degrees) of the subject.

The objective function determination module 430 may determine an objective function based on the at least one restriction factor. In some embodiments, the target image of the subject may be reconstructed based on the scanning data and the at least one prior image according to an iterative reconstruction algorithm (e.g., a statistical reconstruction algorithm). The target image may be reconstructed in a plurality of iterations according to an objective function. The objective function may assess a difference between a primary image and an image of desirable quality (e.g., the target image) by updating the primary image.

The reconstruction module 440 may reconstruct a target image of the subject. In some embodiments, the reconstruction module 440 may reconstruct, using the objective function, the target image based on the scanning data and the at least one prior image. In some embodiments, during the plurality of iterations, a function value of the objective function may be assessed until the target image is obtained.

In the plurality of iterations, grey values of elements of the primary image may be updated according to the objective function. In some embodiments, the iterative reconstruction process may terminate if a termination condition is satisfied. For example, the termination condition may include that the function value of the objective function is below a threshold value indicative a desired accuracy. As another example, the termination condition may include that a certain count (or referred to as an iteration count threshold) of iterations have been performed. The threshold value and/or the iteration count threshold may be set by a user, according to default settings of the imaging system 100, etc. The reconstructed image in a last iteration may be designated as the target image.

The modules in the processing device 140 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the above-mentioned modules may be integrated into a console (not shown). Via the console, a user may set parameters for scanning a subject, controlling imaging processes, controlling parameters for reconstruction of an image, viewing images, etc. As another example, the processing device 140 may include a storage module (not shown) configured to store information and/or data (e.g., scanning data, images) associated with the above-mentioned modules. As another example, the restriction factor determination module 420 and the objective function determination module 430 may be combined into one module, such as a determination module.

Figure 5:
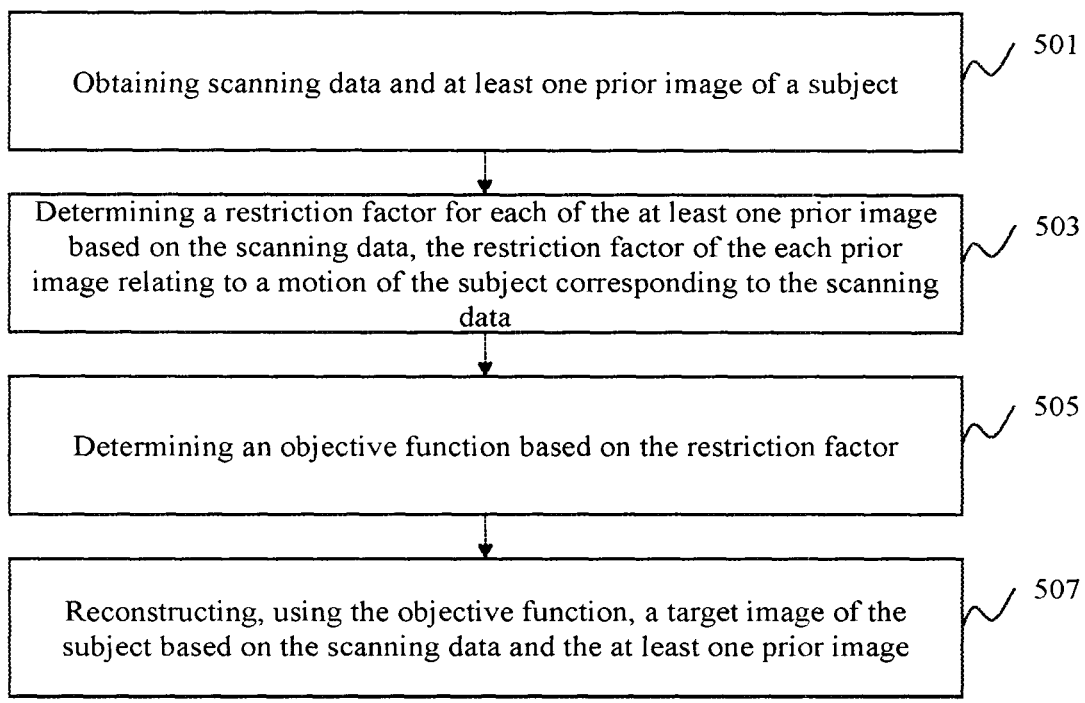
FIG. 5 is a flowchart illustrating an exemplary process for reconstructing an image of a subject according to some embodiments of the present disclosure.

FIG. 5 is a flowchart illustrating an exemplary process for reconstructing an image of a subject according to some embodiments of the present disclosure. In some embodiments, the process 500 may be executed by the imaging system 100. For example, the process 500 may be implemented as a set of instructions (e.g., an application) stored in a storage device (e.g., the storage device 150). The modules described in FIG. 4 and/or the processor 210 may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 501, the processing device 140 (e.g., the processor 210, the obtaining module 410) may obtain scanning data and prior image of a subject.

As used herein, the scanning data may refer to projection data of the subject. In some embodiments, the projection data may include raw data obtained from the scanner 110 (e.g., the detector 112). The scanner 110 may scan the subject according to a scanning protocol, and generate the projection data of the subject. Merely by way of example, when the scanner 110 scans the subject, the gantry 111 may rotate, for example, clockwise or counterclockwise, about an axis of rotation of the scanner 110. The radiation source 115 may rotate together with the gantry 111. During this process, the radiation source 115 may emit a radiation beam (e.g., an X-ray beam). At least a portion of the radiation beam may pass through the subject, and detected by the detector 112. The detected radiation beam may be converted into the projection data. In some embodiments, the projection data may further be processed (e.g., denoised, filtered, etc.). In some embodiments, the projection data may be obtained from a storage device (e.g., the storage device 150) via a network (e.g., the network 120).

The subject may include any biological subject (e.g., a human being, an animal, a plant, or a portion thereof) and/or a non-biological subject (e.g., a phantom). In some embodiments, the subject may include a specific portion of a body, such as the head, the thorax, the abdomen, or the like, or a combination thereof, of the subject. In some embodiments, the subject may include a specific organ, such as the heart, the esophagus, the trachea, the bronchus, the stomach, the gallbladder, the small intestine, the colon, the bladder, the ureter, the uterus, the fallopian tube, etc. In some embodiments, the subject may be a man-made composition of organic and/or inorganic matters that are with or without metabolism.

In some embodiments, the scanning data may be obtained from one or more scanning angles of the scanner 110. When the scanner 110 scans the subject, the gantry 111 may rotate, according to a scanning protocol, about the axis of rotation of the scanner 110. The radiation source 115 may rotate together with the gantry 111. As used herein, a scanning angle of the scanner 110 refers to an angle of the radiation source 115 with respect to a reference plane when the radiation source 115 emits radiation toward the subject for imaging. For instance, the reference plane may be a plane parallel to the floor or the ceiling of the room where the scanner 110 is placed. As used herein, a scanning angle range of the scanner 110 (or of the radiation source 115) refers to a range of the scanning angles that the radiation source 115 traverses in a scan. A scanning rotation angle of the scanner 110 may correspond to a rotation angle of the gantry 111. The scanning data of the subject may correspond to any scanning angle range within the range of 0°-360°. For example, the scanning angle range may be 30°-120°, 90°-240°, 200°-270°, 240°-360°, etc.

In some embodiments, the scanning angle range in a specific scan may be determined by a user, or according to default settings of the imaging system 100. In some other embodiments, the scanning angle range corresponding to the scanning data may be determined according to various imaging conditions or characteristics of the subject (e.g., a motion condition of the subject). In some embodiments, motion conditions of different subjects may be different. Accordingly, the scanning angle ranges in different scans may be different. For example, if the subject, or a portion thereof, undergoes an intense motion (e.g., at a relatively high frequency and/or a relatively large amplitude), a small scanning angle range may be set in the scanning protocol such that the imaging quality may be improved in terms of, e.g., improved temporal resolution, reduced motion artifact, or the like, or a combination thereof. Moreover, a smaller scanning angle range may be associated with a shorter scanning time (or data acquisition period), compared with a large scanning angle range. Merely by way of example, a small scanning angle range of 0°-200°, 30°-220°, 60°-270°, 90°-300°, etc., may be set in the scanning protocol. A smaller scanning angle range may correspond to a shorter data acquisition time period. Compared with a large scanning angle range, an image reconstructed based on scanning data corresponding to the smaller scanning angle range may have a better temporal resolution. As used herein, a temporal resolution refers to a minimum data acquisition time period needed to reconstruct an image based on scanning data corresponding to a minimum scanning angle range.

A prior image of the subject may be an image reconstructed based on reference data of the subject. The reference data may be projection data obtained from the scanner 110. The reference data may correspond to a reference scanning angle range of the scanner 110. In some embodiments, the reference scanning angle range may exceed the scanning angle range corresponding to the scanning data. For example, the scanning angle range corresponding to the scanning data is 90°-240°; the reference scanning angle range corresponding to the reference data is in the range of, for example, 90°-270°, 60°-300°, 0°-360°, etc. Since the reference scanning angle range corresponding to the reference data exceeds the scanning angle range corresponding to the scanning data, the amount of reference data may exceed that of the scanning data. Accordingly, the prior image may include more details of the subject than a target image to be reconstructed based solely on the scanning data. In this case, the prior image may be used as a guidance of the reconstruction of the target image, or a supplement to the target image in the reconstruction process of the target image. In some embodiments, the reference data and the scanning data may be obtained in a single scan of the subject. For example, first projection data corresponding to a smaller scanning angle range generated in the single scan may be designated as the scanning data, and second scanning data corresponding to a larger scanning angle range generated in the same single scan may be designated as the reference data.

In some embodiments, the prior image may correspond to a larger portion of subject than that of the target image. For example, the prior image may correspond to the heart of a patient, and the target image may correspond to certain blood vessels of the heart.

In some embodiments, the prior image may be reconstructed according to an image reconstruction algorithm. Exemplary image reconstruction algorithms may include but not limited to an iterative reconstruction algorithm (e.g., statistical reconstruction algorithm), a Fourier slice theorem algorithm, a fan beam reconstruction algorithm, an analytical reconstruction algorithm (e.g., filtered back projection (FBP) algorithm), an algebraic reconstruction technology (ART), a simultaneous algebraic reconstruction technology (SART), a Feldkamp-Davis-Kress (FDK) reconstruction algorithm, or the like, or any combination thereof.

In 503, the processing device 140 (e.g., the processor 210, the restriction factor determination module 410) may determine a restriction factor for the prior image based on the scanning data.

Since the prior image of the subject corresponds to a larger reference scanning angle range than the scanning angle range corresponding to the scanning data, the prior image may correspond to a lower time resolution. In this case, if the subject or a portion thereof move intensely, at least a corresponding portion of the prior image may be restricted, and not be used as a supplement to the primary image (e.g., at least a region of the primary image corresponding to a portion of the subject that moves intensely) in the reconstruction process. Otherwise, motion artifacts (e.g., motion blur) may be introduced to the target image by the prior image.

In some embodiments, a motion degree of the subject may be determined. The motion degree herein may reflect a motion intensity of the subject or a portion thereof. In some embodiments, a plurality of motion degrees (e.g., a first motion degree, a second motion degree, a third motion degree, etc.) may be established. The motion degree of the subject may be selected from the plurality of motion degrees based on motion intensities of the subject. The more intense motion the subject or a portion thereof undergoes, the larger the motion degree will be. The smoother motion the subject undergoes, the smaller the motion degree will be. In some embodiments, if the motion degree of a portion of the subject exceeds a motion degree threshold, the region of the prior image that corresponds to the portion of the subject may need to be restricted, and not be applied in the reconstruction process of the target image directly; i.e., the region of the target image corresponding to the portion of the subject may be reconstructed based only on the scanning data. As used herein, a region of an image is considered corresponding to a portion of a subject if the region of the image includes a representation of the portion of the subject. For example, if the subject is the heart of a patient, coronary arteries in the heart may be deemed to move intensely in a cardiac scan, and a motion degree of coronary arteries of the heart may exceed the motion degree threshold. A region of a prior image of the heart corresponding to the coronary arteries may need to be restricted, and not used in the reconstruction of a target image of the heart since the poor temporal resolution of the prior image may affect the quality of the coronary arteries in the target image of the heart. If the motion degree of a portion of the subject is below the motion degree threshold, the corresponding region of the prior image may be applied in the image reconstruction directly; i.e., the target image may be reconstructed based at least in part on the prior image. For example, if the subject is the nose of the patient, and a motion degree of the nose is below the motion degree threshold, a prior image of the nose may be applied in the reconstruction of a target image of the nose since the nose is static during the data acquisition process, and the prior image of the nose may provide more details to the nose in the target image without affecting the quality of the target image. The plurality of motion degrees and/or the motion degree threshold may be set by a user, or according to default settings of the imaging system 100, etc.

To selectively apply a prior image in the reconstruction of a target image, a restriction factor for the prior image may be provided. In some embodiments, the restriction factor may be a map. The restriction factor may relate to a motion of the subject. The restriction factor may modulate the restriction of the prior image in the reconstruction of the target image. In some embodiment, the restriction factor may be a matrix, a vector, etc. In some embodiments, the restriction factor may include a plurality of restriction elements. Each of plurality of restriction element may be a restriction factor or element. In some embodiments, each of the plurality of restriction element may correspond to at least one element in the prior image. As used herein, an element of an image refers to a pixel or a voxel of the image.

In some embodiments, the processing device 140 may identify one or more portions of the subject with motion degrees below the motion degree threshold, and apply corresponding portions of the prior image to the reconstruction of the target image according to the restriction factor. In this process, the processing device 140 may also identify one or more portions of the subject with motion degrees exceeding the motion degree threshold, and may restrict the application of corresponding regions of the prior image in the reconstruction of the target image according to the restriction factor. More descriptions regarding the restriction factor for the prior image may be found elsewhere in the present disclosure. See, for example, FIGS. 6-8 and relevant descriptions thereof.

In 505, the processing device 140 (e.g., the processor 210, the objective function determination module 430) may determine an objective function based on the restriction factor.

In some embodiments, the target image of the subject may be reconstructed based on the scanning data and the prior image according to an iterative reconstruction algorithm (e.g., a statistical reconstruction algorithm). The target image may be reconstructed in an iterative process including a plurality of iterations according to an objective function. The objective function may assess a difference between a primary image and an image of desirable quality (e.g., the target image) by updating the primary image.

Merely by way of example, the primary image may be reconstructed based on the scanning data in a first iteration of the plurality of iterations. During the iterative reconstruction process of the target image, grey values of elements of the primary image may be updated in the plurality of iterations according to the objective function. In some embodiments, the objective function may be expressed as Formula (1):

$$\min_{x \geq 0} \|AX - Y\|_w^2 + \beta R(X) + \alpha R(X - X_{prior}), \quad (1)$$

where X denotes projection data of the target image, Y denotes the scanning data obtained in 501 (e.g., raw data obtained from the scanner 110), A denotes a system matrix of the imaging system 100, w denotes weight parameters of the scanning data determined according to a noise model. For example, the weight w may be calculated according to quantum noise under current scan parameters of the scanner 110. R denotes a regularization function, β denotes a regularization coefficient of the regularization function, $X_{prior}$ denotes the reference data corresponding to the prior image, and α denotes the restriction factor for the prior image.

The regularization function R may suppress overall noise of intermediate images reconstructed in the plurality of iterations. The regularization coefficient β may control a strength of the regularization applied to the intermediate images and/or the target image. In some embodiments, β may be a constant which can be selected form a range of values. In some embodiments, the regularization coefficient β may be a preset value. In some embodiments, the regularization coefficient β may be a variable with respect to the number or count of the iterations, the type of the subject, etc. The variable may be adjusted according to different situations in order to balance a deviation of projection and smooth the intermediate images and/or the target image obtained in the iterative process.

The restriction factor α may be a matrix or data array that modulates the restriction on the impact exerted by the elements of the prior image on the intermediate images and/or the target image. The restriction factor α may also be used to modulate a degree of regularization for the intermediate images. In some embodiments, the weight w may be determined according to noise in actual conditions. For example, the weight w may be calculated according to quantum noise under current scan parameters of the scanner 110.

In 507, the processing device 140 (e.g., the processor 210, the reconstruction module 440) may reconstruct, using the objective function, a target image of the subject based on the scanning data and the prior image.

In some embodiments, during the plurality of iterations, a function value of the objective function may be assessed until the target image is obtained.

In some embodiments, the scanning data may be further processed by performing various processing operations, such as air correction, convolution, back projection, etc. The primary image may be reconstructed based on the processed scanning data. In some embodiments, the primary image may be reconstructed according to the image reconstruction algorithm exemplified above.

In the plurality of iterations, grey values of elements of the primary image may be updated according to the objective function. In some embodiments, the iterative reconstruction process may terminate if a termination condition is satisfied. For example, the termination condition may include that the function value of the objective function is below a threshold value indicative a desired accuracy. As another example, the termination condition may include that a certain count (or referred to as an iteration count threshold) of iterations have been performed. The threshold value and/or the iteration count threshold may be set by a user, according to default settings of the imaging system 100, etc. The reconstructed image in a last iteration may be designated as the target image.

According to some embodiments of the present disclosure, the restriction factor for the prior image may adjust the strengths of the impact exerted by at least one element of the prior image on the corresponding element(s) of the intermediate images and/or the target image according to a motion degree of a corresponding portion of the subject. In some embodiments, a region of an image (e.g., the primary image) corresponding to a motion degree below the motion degree threshold may be reconstructed based on a corresponding portion of the prior image, and a region of the image corresponding to a motion degree exceeding the motion degree threshold may be reconstructed based solely on the scanning data. Thus, the efficiency of the imaging process is improved, and the quality of the target image of the subject is enhanced as well.

Figure 6:
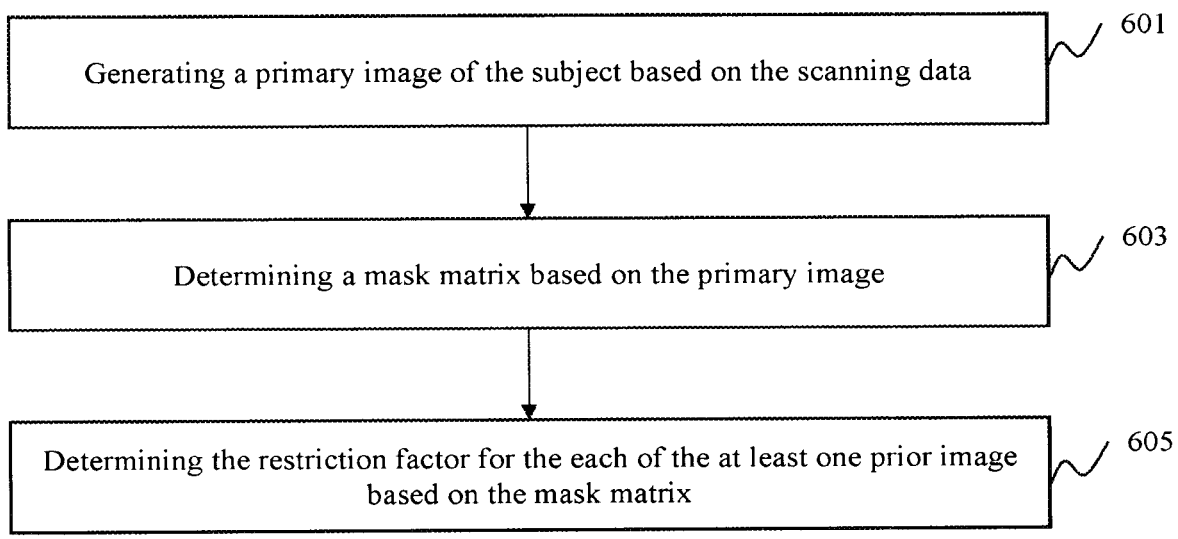
FIG. 6 is a flowchart illustrating an exemplary process for determining a restriction factor for a prior image according to some embodiments of the present disclosure.

FIG. 6 is a flowchart illustrating an exemplary process for determining a restriction factor for a prior image according to some embodiments of the present disclosure. In some embodiments, one or more operations of the process 600 may be implemented in the imaging system 100 as illustrated in FIG. 1. For example, one or more operations of the process 600 may be stored in the storage device 150 in the form of instructions, and invoked and/or executed by the processing device 140 (e.g., the processor 210 of the computing device 200 as illustrated in FIG. 2, the CPU 340 of the mobile device 300 as illustrated in FIG. 3). In some embodiments, the process 600 may be executed by the restriction factor determination module 420. In some embodiments, the operation 503 of the process 500 in FIG. 5 may be performed according to the process 600.

In 601, the processing device 140 (e.g., the processor 210) may generate a primary image of a subject based on scanning data of the subject.

In some embodiments, the primary image may be reconstructed based on the scanning data obtained in 501 of the process 500. In some embodiments, the primary image may be reconstructed in a first iteration of the iterative reconstruction process of the target image of the subject. In some embodiments, the primary image may be reconstructed, according to any suitable image reconstruction algorithm, based on the scanning data. Exemplary image reconstruction algorithms used to reconstruct the primary include may include a Fourier slice theorem algorithm, a fan beam reconstruction algorithm, an analytical reconstruction algorithm (for example, filter inverse Projection (FBP) algorithm), an algebraic reconstruction technology (ART), a simultaneous algebraic reconstruction technology (SART), a Feldkamp-Davis-Kress (FDK) reconstruction algorithm, or the like, or any combination thereof. In some embodiments, the primary image may be obtained from a storage device (e.g., the storage device 150) of the imaging system 100 or an external storage device (e.g., a cloud database).

In 603, the processing device 140 (e.g., the processor 210) may determine a mask matrix based on the primary image.

In some embodiments, the mask matrix may provide a global or partial shielding for an image (e.g., the primary image). When a processing operation (e.g., denoising, image enhancement, feature extraction, modification or replacement based on the prior image, etc.) is performed on the primary image, the mask matrix may distinguish at least one element (e.g., an element or a region constituted by a plurality of elements) of the primary image which does not need to be processed and shield the at least one element of the primary image from being subject to the operation. In some embodiments, the mask matrix may a provide partial shielding for at least one region of an image to be updated (e.g., the primary image or an intermediate image generated by updating the primary image) in the iterative reconstruction process by multiplying the mask matrix with the image to be updated.

In some embodiments, the mask matrix may be a matrix, a vector, etc. The mask matrix may include one or more mask elements. In some embodiments, the one or more mask elements may correspond to elements of the primary image. In some embodiments, each of the one or more mask elements may correspond to an element of the primary image. For example, the number or count of the mask elements may be equal to the number or count of the elements in the primary image; a mask element may correspond to an element in the primary image. In some embodiments, each of the one or more mask elements may correspond to two or more elements of the primary image. For example, in a case that the primary image includes a large number (count) of elements (e.g., the primary image has a relatively high resolution such as 7680×4320 pixels), a mask element of the mask matrix may correspond to a set of elements (e.g., 25 elements, 100 elements, etc.) of the primary image. In some embodiments, the set of elements may constitute a region (e.g., a region of 5×5 pixels, 10×10 pixels) in the primary image.

As described in 501 of the process 500, the scanning data may correspond to a smaller scanning angle range relative to the reference data, thus having a better temporal resolution. At the same time, the smaller scanning angle range may lead to data deficiency. Thus, an image reconstructed based only on the scanning data may have less desirable quality. In this case, the prior image of the subject, which corresponds to a larger scanning angle range and contains richer information, may be provided in the reconstruction of the target image to supplement details for the target image. Since the prior image of the subject corresponds to a larger reference scanning angle range, the prior image may correspond to a lower time resolution. Thus, if the subject or a portion thereof move intensely during a scan on the basis of which the prior image is obtained, the prior image or corresponding elements thereof may need to be restricted, and not used at all or used to a limited extent, as a supplement to the primary image (e.g., at least a region of the primary image corresponding to the portion of the subject that moves intensely) in the reconstruction process.

In some embodiments, the primary image may be segmented into one or more regions according to a segmentation algorithm or a segmentation model. In some embodiments, the primary image may be segmented into the one or more regions based on motion degrees of one or more portions of the subject corresponding to the one or more regions. For example, the primary image may be segmented into at least one first region and at least one second region. The at least one first region corresponds to a portion of the subject whose motion degree exceeds the motion degree threshold. In some embodiments, the mask matrix may shield elements of the at least one first region completely or to a certain extent from being modified or replaced by the prior image or corresponding elements thereof. In this case, the prior image or corresponding elements thereof may be restricted, and not supplement the at least one first region of the primary image. The at least one second region may correspond to a portion of the subject whose motion degree is below the motion degree threshold. In some embodiments, the mask matrix may provide no or little shielding for elements of the at least one second region from being modified or replaced by the prior image or corresponding elements thereof. In this case, the prior image or corresponding elements thereof may need not to be restricted at all or be restricted partially, and supplement, to a certain extent, the at least one second region of the primary image.

In some embodiments, the mask matrix corresponding to the primary image may be determined based on the one or more segmented regions and the motion degree corresponding to each of the one or more segmented regions. Merely by way of example, mask elements of the primary mask matrix corresponding to the at least one first region may be set to a first value (e.g., 0, 0.1, etc.), and mask elements of the primary mask matrix corresponding to the at least one second region may be set to a second value (e.g., 0.8, 1, etc.). In some embodiments, at least one transition region may be identified by expanding a first region, and mask elements corresponding to elements in the transition region may be set to a third value. More descriptions regarding the determination of the mask matrix may be found elsewhere in the present disclosure. See, e.g., FIG. 7 and relevant descriptions thereof.

In 605, the processing device 140 (e.g., the processor 210, the restriction factor determination module 420) may determine the restriction factor for the prior image based on the mask matrix. In some embodiments, the restriction factor may be a map.

In some embodiments, the number or count of the mask elements of the mask matrix may be equal to the number or count of the restriction elements of the restriction factor. In another word, the mask matrix may have a same size or dimension as the restriction factor. In some embodiments, the restriction factor may be determined by adjusting values of the plurality of the mask elements of the mask matrix. Merely for illustration purposes, the processing device 140 may adjust the values of the plurality of the mask elements of the mask matrix based on a preset function and a primary restriction factor. The preset function may include a cosine function, a normalization function, etc. The primary restriction factor may be a global restriction factor that modulates impact of the entire prior image. In some embodiments, all the mask elements of the primary restriction factor may have a uniform value, such as 0.5, 0.8, 1, 2, etc.

In some embodiments, the primary image may be a 3D image. The mask matrix may be a 3D matrix. An adjusted mask matrix may be determined by adjusting values of the plurality of the mask elements of the mask matrix according to the preset function. Merely by way of example, the adjusted mask matrix may be determined according to Formula (2):

$$Mask_{adj} = \cos(Mask(x, y, z) * \frac{\pi}{2}), \quad (2)$$

where $Mask_{adj}$ denotes the adjusted mask matrix, and Mask (x, y, z) represents a value of a mask element of the mask matrix corresponding to a voxel with coordinates (x, y, z) in the primary image. Coordinates of elements of an image (e.g., the primary image) may be determined with reference to a coordinate system, e.g., an image coordinate system, the coordinate system 160, etc.

In some embodiments, the restriction factor may be determined based on the adjusted mask matrix and the primary restriction factor. For example, the restriction factor may be determined according to Formula (3):

$$\alpha(x, y, z) = \alpha_0 * \left(\cos(Mask(x, y, z) * \frac{\pi}{2})\right)^k, \quad (3)$$

where $\alpha(x, y, z)$ denotes a value of a restriction element of the restriction factor that corresponds to a voxel with coordinates (x, y, z) in the primary image, $\alpha_0$ denotes the primary restriction factor, and k denotes a parameter relating to the regions in the primary image and motion degrees of the regions.

In some embodiments, the parameter k may relate to transition between the at least one first region and the at least one second region (e.g., the at least one transition region), and/or motion degrees of the at least one first region, the at least one second region, and/or the at least one transition region. In some embodiments, a value of the parameter k may be greater than zero. During a reconstruction process of the target image of the subject, if a first region corresponds to a portion of the subject whose motion degree is much larger than the motion degree threshold, the parameter k may be set as a relatively large value (e.g., 5), indicating that the restriction element(s) of the restriction map corresponding to the first region is close to zero. If a first region corresponds to a portion of the subject whose motion degree is slightly larger than the motion degree threshold, the parameter k may be set as a relatively small value (e.g., 0.1), indicating that the restriction element(s) of the restriction map corresponding to the first region is close to $\alpha_0$. In some embodiments, the larger the motion degree of the portion of the subject corresponding to a first region is, the larger the value of the parameter k may be.

Figure 7:
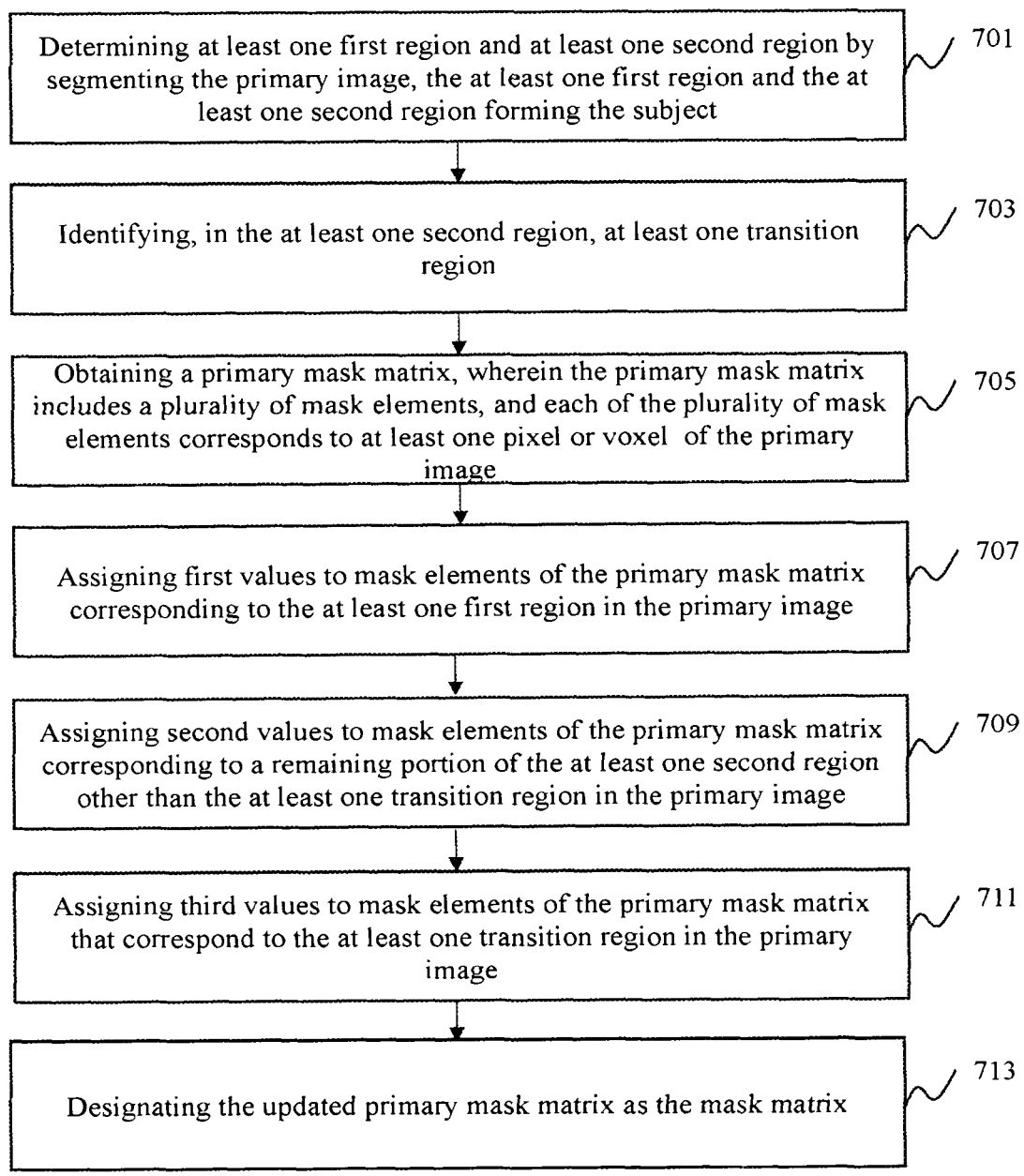
FIG. 7 is a flowchart illustrating an exemplary process for determining a mask matrix according to some embodiments of the present disclosure.

FIG. 7 is a flowchart illustrating an exemplary process for determining a mask matrix according to some embodiments of the present disclosure. In some embodiments, one or more operations of the process 700 may be implemented by the imaging system 100 illustrated in FIG. 1. For example, one or more operations of the process 700 may be stored in the storage device 150 in the form of instructions, and invoked and/or executed by the processing device 140. In some embodiments, the process 700 may be executed by the restriction factor determination module 420.

In 701, the processing device 140 (e.g., the processor 210) may determine at least one first region and at least one second region by segmenting a primary image.

In some embodiments, the subject may include at least one portion that undergoes intense motion (also referred to motion portion) and at least one portion of substantially no motion (also referred to as static portion). For example, coronary arteries of the heart of a patient may move intensely, and portions away from the coronary arteries of the heart may move smoothly. In some embodiments, the motion of the subject or a portion thereof may be quantified by a motion degree. The motion degree may reflect an intensity of the motion of the subject or a portion thereof. In some embodiments, a plurality of motion degrees (e.g., a first motion degree, a second motion degree, a third motion degree, etc.) may be established. The motion degree of the subject may be selected from the plurality of motion degrees based on motion intensities of the subject. For example, a motion portion of the subject may correspond to a larger motion degree (e.g., a first motion degree, which exceeds a motion degree threshold), and a static portion of the subject may correspond to a smaller motion degree (e.g., a second motion degree, which is below or equal to a motion degree threshold). In some embodiments, the primary image may be segmented into one or more regions based on the motion degrees of the corresponding portions of the subject.

In some embodiments, the primary image may be segmented into the one or more regions according to an image segmentation algorithm and/or a segmentation model. Exemplary image segmentation algorithms may include a fast marching segmentation algorithm, a live wire segmentation algorithm, a region growth segmentation algorithm, a threshold-based segmentation algorithm, or the like, or any combination thereof. Exemplary segmentation models may include a deep belief network (DBN), a Stacked Auto-Encoders (SAE), a logistic regression (LR) model, a support vector machine (SVM) model, a decision tree model, a Naive Bayesian Model, a random forest model, or a Restricted Boltzmann Machine (RBM), a Gradient Boosting Decision Tree (GBDT) model, a LambdaMART model, an adaptive boosting model, a recurrent neural network (RNN) model, a convolutional network model, a hidden Markov model, a perceptron neural network model, a Hopfield network model, or the like, or any combination thereof.

In some embodiments, the segmentation model may be a neural network model. In some embodiments, the segmentation model may be trained based on a plurality of sample images or video frames of various subjects. Features of moving portions and/or static portions of the subjects may be extracted from the plurality of sample images, and used to train the segmentation model.

Merely for illustration purposes, during the training process of the segmentation model, a plurality of sample images or video frames including the heart of the patient may be obtained. Each of the plurality of sample images may include the heart of a patient. Features of the coronary arteries of the heart of the patient in each of the plurality of sample images may be extracted. Exemplary features may include a motion degree, an outline, a size, a shape, a length, etc., of each of the coronary arteries of the heart of the patient. The features may be in the form of a vector, a matrix, etc. In some embodiments, the features may be input into the segmentation model to train the segmentation model. In some embodiments, the training process of the segmentation model may terminate until a loss function (e.g., a cross-entropy loss function) reaches a convergence.

In some other embodiments, the primary image may be segmented by a manual operation from a user (e.g., a doctor, a technician, etc.). For example, a user may identify different regions corresponding to different motion degrees in the primary image via visual inspection. The user may segment a region of the primary image by drawing an outline of the region manually via an interface (e.g., an interface on a terminal, a virtual interface, etc.) on which the primary image is displayed.

In some embodiments, the primary image may be segmented into at least one first region of a first motion degree and at least one second region of a second motion degree. In some embodiments, the at least one first region may correspond to at least one motion portion of the subject. In some embodiments, the at least one second region may correspond to at least one static portion of the subject. Merely by way of example, the at least one first region may correspond to coronary arteries of the heart of a patient, the at least one second region may correspond to remaining portions of the heart.

In 703, the processing device 140 (e.g., the processor 210) may identify, in the at least one second region, at least one transition region.

Generally, a vicinity of the motion portion of the subject may be affected by the motion of the motion portion. Motion degrees of one or more portions of the subject around the motion portion may exceed motion degrees of static portions away from the motion portion of the subject. In some embodiments, the one or more portions of the subject around the motion portion may be determined by identifying, in the primary image, at least one region around a first region corresponding to the motion portion of the subject. The at least one region of the primary image may be defined as at least one transition region. The at least one transition region of the primary image may correspond to the one or more portions of the subject around the motion portion. The at least one transition region may facilitate a smooth transition between the at least one first region of the first motion degree and the at least one second region of the second degree. In some embodiment, the at least one transition region may correspond to a third motion degree, and the third motion degree may be between the first motion degree and the second motion degree.

In some embodiments, the at least one transition region may be determined by performing an expansion operation on the at least one first region of the primary image. In some embodiments, a width of a transition region determined based on a difference between the first motion degree and the second motion degree. Merely by way of example, if a difference between the first motion degree and the second motion degree exceeds a threshold difference, the transition region may have a first width. If the difference between the first motion degree and the second motion degree is equal to or below the threshold difference, the transition region may have a second width. The threshold difference, the first width, and/or the second width may be set by a user, according to default settings of the imaging system 100, etc. After the at least one transition region is determined, the primary image may include at least one first region (also referred to as motion region), at least one transition region, and at least one remaining portion of the at least one second region other than the at least one transition region (also referred to as static region).

In 705, the processing device 140 (e.g., the processor 210) may obtain a primary mask matrix. The primary mask matrix may include a plurality of mask elements, and each of the plurality of mask elements may correspond to at least one element of the primary image.

In some embodiments, the number or count of the mask elements of the primary mask matrix may be equal to the number or count of mask elements of the mask matrix. Values of the plurality of mask elements of the primary mask matrix may also be referred to as primary values. In some embodiments, the primary values may be default numbers, such as 0, 0.5, 1, etc. In some embodiments, the primary values may be set by a user, according to default settings of the imaging system 100, etc. For example, the primary values of all the mask elements of the primary mask matrix may set to 0. As another example, the primary values of all the primary mask elements of the primary mask matrix may be set to 1.

The mask matrix may be determined by updating the primary values of the primary mask matrix based on the primary image. In some embodiments, the primary mask matrix may be updated by assigning a value to each mask element of the primary mask matrix based on at least one pixel or voxel in the primary image corresponding to the mask element.

In 707, the processing device 140 (e.g., the processor 210) may assign first values to mask elements of the primary mask matrix that correspond to the at least one first region of the primary image.

According to characteristics of a mask, the values of the mask elements of the mask matrix may range from 0 to 1. The first values assigned to mask elements corresponding to the at least one first region may be any suitable values in the range from 0 to 1. In some embodiments, the first values of all the mask elements corresponding to the at least one first region may have a same value, e.g., 0.5, 0.8, 0.9, or 1.

In 709, the processing device 140 (e.g., the processor 210) may assign second values to mask elements of the primary mask matrix that correspond to a remaining portion of the at least one second region other than the at least one transition region of the primary image. The remaining portion of the at least one second region other than the at least one transition region of the primary image may also be referred to as the static region.

In some embodiments, the second values assigned to mask elements of the primary mask matrix corresponding to the at least one static region may be any suitable values in the range from 0 to 1. In some embodiments, the second values of all the mask elements corresponding to the at least one static region may have a same value, e.g., 0, 0.1, etc.

Merely for illustration purposes, the first values and the second values may be assigned to the corresponding mask elements according to Formula (4)

$$\text{Mask}(x, y, z) = \begin{cases} 1, & \text{Pixel }(x, y, z) \text{ belongs to a motion region} \\ 0, & \text{Pixel }(x, y, z) \text{ belongs to a static region} \end{cases} \quad (4)$$

where Pixel (x, y, z) denotes a pixel or a voxel with coordinates (x, y, z) in the primary image, and Mask (x, y, z) denotes a value of a mask element of the primary mask matrix corresponding to the pixel or voxel with coordinates (x, y, z) in the primary image. As for the heart of a patient, each of the at least one motion region may correspond to a coronary artery or a portion thereof. Since the coronary arteries move intensely, projection data corresponding to a relatively high temporal resolution (e.g., the scanning data obtained in 501) is needed for reconstructing the image of the coronary arteries. In this case, the prior image may be restricted, and not be used in the image reconstruction of the motion region corresponding to the coronary arteries. The first values assigned to the mask elements in the mask matrix corresponding to the motion region, which corresponds to the coronary arteries of the heart of the patient, may be set to 1. As for a remaining portion of the at least one second region other than the at least one transition region of the primary image (i.e., the static region), projection data of a relatively low temporal resolution (e.g., the reference data corresponding to the prior image) may be used. In this case, the prior image may be used in the image reconstruction of the static region. The second values assigned to the mask elements in the mask matrix corresponding to the static region may be set to 0.

In 711, the processing device 140 (e.g., the processor 210) may assign third values to mask elements of the primary mask matrix that correspond to the at least one transition region of the primary image.

In some embodiments, the third value assigned to the mask elements corresponding to elements in the at least one transition region may be determined based on the first values and the second values. In some embodiments, the third values may be between a smallest first value among the first values and a largest second value among the second values.

The third values assigned to the mask elements of the mask matrix corresponding to the at least one transition region may be determined in various ways. For example, a plurality of lines in certain directions (e.g., along the x-direction, the y-direction, the z-direction, or a combination thereof, with reference to the coordinate system 160, or a direction along a curve, etc.) may be determined in the primary image. Pixels or voxels on each line in the at least one transition region may be between a pixel or voxel in a motion region (also referred to as a start element for clarity) and a pixel or voxel in a static region on the line (also referred to as an end element for clarity). In some embodiments, third values assigned to the mask elements corresponding to the pixels or voxels on each line in the at least one transition region may be determined based on a first value (e.g., M) of a mask element corresponding to start element and a second value (e.g., N) of a mask element corresponding to the end element. For example, the third values assigned to the mask elements corresponding to the pixels or voxels on the line may range from N to M. In some embodiments, the third values assigned to the mask elements corresponding to the pixels or voxels on the line may conform a function, such as a linear function, a square function, a quadratic function, or the like, or any combination thereof. As another example, a third value to be assigned for a mask element corresponding to a particular element in a transition region may be a mean value (e.g., an arithmetic mean value, a weighted mean value, etc.) of mask elements corresponding to elements in a certain range around the particular element in the primary image.

In 713, the processing device 140 (e.g., the processor 210) may designate the updated primary mask matrix as the mask matrix. In some embodiments, after a value of each element of the primary mask matrix is updated, the primary mask matrix may be designated as the mask matrix corresponding to the primary image.

It should be noted that the above description of the process 700 is provided for illustration, not intended to limit the scope of the present disclosure. For persons having ordinary skills in the art, multiple variations and modifications may be reduced to practice in the light of the present disclosure. For example, the at least one motion region may correspond to different motion degrees, and different first values may be assigned to the mask elements corresponding to the at least one motion region. Similarly, the at least one static region may correspond to different motion degrees, and different second values may be assigned to the mask elements corresponding to the at least one static region. However, these variations and modifications fall in the scope of the present disclosure.

Figure 8:
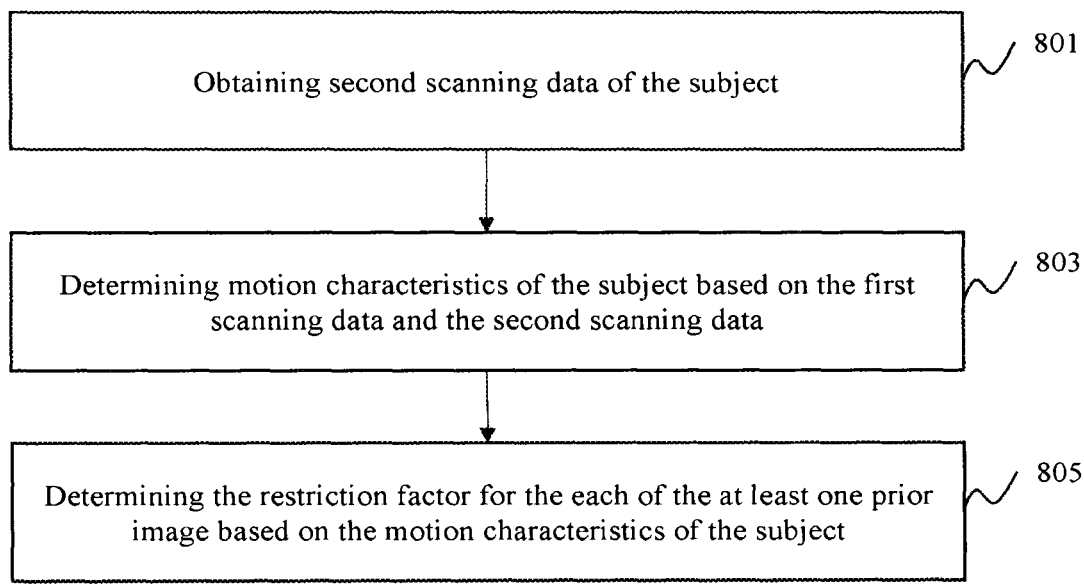
FIG. 8 is another flowchart illustrating an exemplary process for determining a restriction factor for a prior image according to some embodiments of the present disclosure.

FIG. 8 is another flowchart illustrating an exemplary process for determining a restriction factor for a prior image according to some embodiments of the present disclosure. In some embodiments, one or more operations in the process 800 may be implemented in the system 100 shown in FIG. 1. For example, one or more operations in the process 800 may be stored in the storage device 150 in the form of instructions, and called and/or executed by the processing device 140. In some embodiments, the process 800 may be executed by the restriction factor determination module 420.

In 801, the processing device 140 (e.g., the processor 210, the restriction factor determination module 420) may obtain second scanning data of the subject. The second scanning data may relate to the scanning data obtained in 501 (also referred to as the first scanning data).

In some embodiments, the second scanning data may be obtained from a scanner that scans the subject, such as the scanner 110. In some embodiments, the first scanning data and the second scanning data may be obtained in a same single scan of the subject.

In some embodiments, the subject may be a biological subject (e.g., a human being, an animal, or a portion thereof). The subject or a portion thereof may move (e.g., regularly) relative to the scanner 110 in the data acquisition process of the first scanning data and/or the second scanning data. As for a subject that moves regularly, one or more motion phases regarding the motion of the subject may be determined. A motion phase may correspond to a state of the subject at a time instant in a motion cycle of the subject. The motion cycle may be a time period during which the subject gets into a dynamic motion state from a static state, and returns back to the static state. In some embodiments, the one or more motion phases may be represented by a time instant in the motion cycle. Merely by way of example, a motion cycle of the heart of a patient is defined as T, and a motion phase represented by 0.4T may correspond to a state of the heart at 40% of the motion cycle of the heart.

In some embodiments, the first scanning data may correspond to a first motion phase of the subject. The second scanning data may correspond to a second motion phase of the subject. The first motion phase may be different from the second motion phase. As used herein, scanning data corresponding to a motion phase may refer that the scanning data may be obtained from a scanning angle range of the scanner 110 determined based on the motion phase. The motion phase may correspond to a data acquisition time instant, and the data acquisition time instant may further correspond to a particular rotation angle of the scanner 110. The scanning angle range may be determined by setting an upper limit angle and a lower limit angle. In some embodiments, the upper limit angle may be determined by increasing the rotation angle corresponding to the motion phase by a first angle value, and the lower limit angle range may be determined by decreasing the rotation angle by a second angle value. In some embodiments, the first angle value may be equal to the second angle value.

In some embodiments, the first motion phase and the second motion phase may be consecutive to each other. For example, the first motion phase may be 0.4 T, and the second motion phase may be 0.2 T or 0.6 T. In some embodiments, the first motion phase and the second motion phase may not be consecutive to each other. For example, the first motion phase may be 0.2 T, and the second motion phase may be 0.8 T.

In 803, the processing device 140 (e.g., the processor 210, the restriction factor determination module 420) may determine motion characteristics of the subject based on the first scanning data and the second scanning data.

In some embodiments, the motion characteristics may include characteristics such as whether to move, a motion direction, a motion degree, a motion cycle, etc., related to the motion of the subject. In some embodiments, a first image of the subject may be reconstructed based on the first scanning data. The first scanning data may correspond to a first motion phase of the subject in a motion cycle. A second image of the subject may be reconstructed based on the second scanning data. The second scanning data may correspond to a second motion phase of the subject in the motion cycle. In some embodiments, the first motion phase and the second motion phase may be adjacent to (e.g., consecutive to) each other. The processing device 140 may determine one or more motion characteristics of the subject based on the first image and the second image of the subject. In some embodiments, a plurality of images of the subject corresponding to different motion phases (e.g., including the first motion phase and the second motion phase) in a motion cycle of the subject may be reconstructed based on a set of scanning data of the subject (e.g., including the first scanning data and the second scanning data). The processing device 140 may determine the motion characteristics of the subject based on the plurality of images.

Merely by way of example, if the subject is the heart of a patient, a centerline of a coronary artery of the heart may be identified in a plurality of images of the subject. The plurality of images of the subject may be reconstructed based on a set of scanning data (e.g., including the first scanning data and the second scanning data) corresponding to a plurality of motion phases in a motion cycle. A position variance of the centerline of the coronary artery in the one or more images may be determined. For example, coordinates of one or more points on the centerline of the coronary artery in the one or more images may be determined. In some embodiment, the motion characteristics of the subject may be represented by a motion vector. A modulus of the vector may indicate the motion degree of the subject or a portion thereof. A direction of the vector may indicate a motion direction of the subject or a portion thereof. As for the coronary artery of the heart, a motion vector representing the motion characteristics of the coronary artery may be determined based on the position variance of the centerline of the coronary artery in the plurality of images.

In 805, the processing device 140 (e.g., the processor 210, the restriction factor determination module 420) may determine the restriction factor for the prior image based on the motion characteristics of the subject. In some embodiments, the restriction factor may be a map.

In some embodiments, a motion vector field of the subject may be determined based on a plurality of motion vectors corresponding to different portions of the subject. A motion degree of the entire subject or any portion thereof may be determined based on the motion vector field of the subject. As described in 701, the motion degree of the subject may reflect the motion intensity of the subject or the portion thereof. The more intensely the subject or a portion thereof moves, the larger the motion degree is. The more smoothly the subject moves, the smaller the motion degree is.

In some embodiments, the processing device 140 may evaluate the motion degree of the subject or a portion thereof based on the modulus of the motion vectors in the motion vector field. For example, the processing device 140 may compare a modulus of motion vector corresponding to a portion of the subject with a threshold modulus. If the modulus of motion vector exceeds the threshold modulus, it may indicate that the portion of the subject corresponding to the motion vector moves intensely. If the modulus of motion vector is smaller than or equal to the threshold modulus, it may indicate that the portion of the subject corresponding to the motion vector moves smoothly or keeps stationary. An image (e.g., a primary image) of the subject may be segmented into one or more regions according to the moduli of the motion vectors corresponding to the one or more regions.

In an iterative image reconstruction process of scanning data corresponding to a small angle range, restriction for a prior image of the subject in regions in an image (e.g., a primary image, an intermediate image) of the subject with different motion degrees may be different. For example, a first region corresponding to a moving portion of the subject may be reconstructed based only on the scanning data, and the prior image is completely restricted. A second region corresponding to a static portion of the subject may be reconstructed based only on the prior image or based on both the prior image and the scanning data.

In some embodiments, the processing device 140 may obtain a primary restriction factor. The primary restriction factor may be a matrix or a data array, which may have a same size or dimension as a matrix representing the primary image of the subject. Each restriction element of the primary restriction factor may correspond to an element in the primary image. After the primary image of the subject is segmented into one or more regions according to the motion characteristics (e.g., motion degrees) corresponding to the one or more regions, values of the restriction elements of the primary restriction factor corresponding to elements of the primary image may be determined. In some embodiments, a first region of the primary image corresponding to a high motion portion (e.g., a coronary artery of the heart) may correspond to a larger motion degree. The prior image of the subject may be restricted in the first region. Accordingly, restriction elements corresponding to elements in the first region of the primary image may be set to a first value (e.g., 0, 0.1, etc.). A second region of the primary image corresponding to a static portion (e.g., a portion of the heart away from coronary arteries) may correspond to a smaller motion degree. The prior image of the subject may be applied in the first region. Accordingly, restriction elements corresponding to elements in the second region of the primary image may be determined as a second value (e.g., $\alpha_0$, 0.9 $\alpha_0$, etc.). The parameter $\alpha_0$ may denote the primary restriction factor. In some embodiments, at least one transition region may be determined by expanding each first region, and values of restriction elements corresponding to elements in the transition region of the primary image may be determined as a third value. Details regarding the at least one transition region may be described elsewhere in the present disclosure. See, for example, FIG. 7 and relevant descriptions thereof.

It should be noted that the above description of the process 800 is provided for illustration, not intended to limit the scope of the present disclosure. For persons having ordinary skills in the art, multiple variations and modifications may be reduced to practice in the light of the present disclosure. For example, the second scanning data may be retrieved from a storage device (e.g., the storage device 150) of the imaging system 100 or an external database. As another example, the second scanning data may correspond to a plurality of motion phases in the motion cycle of the subject, and a plurality of images representing states of the subject at the plurality of motion phases may be reconstructed based on the second scanning data. However, these variations and modifications fall in the scope of the present disclosure.

Figure 9:
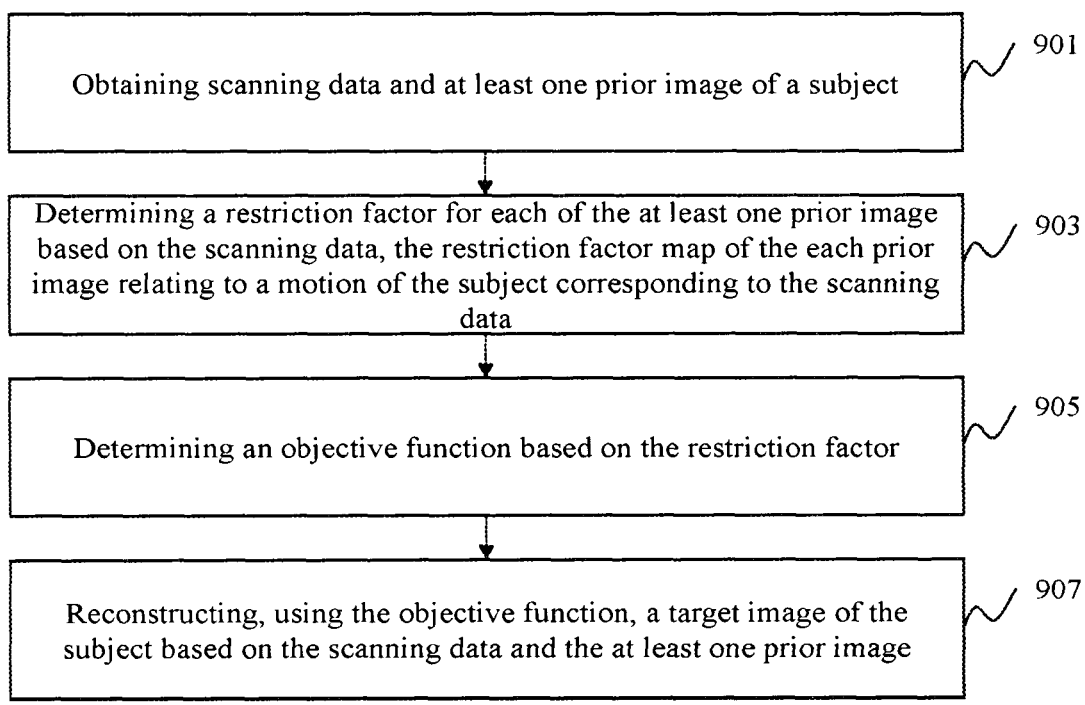
FIG. 9 is a flowchart illustrating an exemplary process for reconstructing an image of a subject according to some embodiments of the present disclosure.

FIG. 9 is a flowchart illustrating an exemplary process for reconstructing an image of a subject according to some embodiments of the present disclosure. In some embodiments, one or more operations in the method 900 may be implemented in the imaging system 100 shown in FIG. 1. For example, one or more operations in the method 900 may be stored in the storage device 150 in the form of instructions, and called and/or executed by the processing device 140.

In 901, the processing device 140 (e.g., the processor 210, the obtaining module 410) may obtain scanning data and a plurality of prior images of a subject.

In some embodiments, the scanning data may be obtained from one or more scanning angle ranges of the scanner 110. The scanning data of the subject may correspond to any scanning angle range within the range of 0°-360°. For example, the scanning angle range may be 30°-120°, 90°-240°, 200°-270°, 240°-360°, etc. In some other embodiments, the scanning angle range corresponding to the scanning data may be determined according to various imaging conditions or characteristics of the subject (e.g., a motion condition of the subject). In some embodiments, the operation 901 may be similar to or the same as the operation 501 of the process 500 in FIG. 5 except that more than one prior image may be obtained in 901.

In some embodiments, the plurality of prior images may be reconstructed based on reference data corresponding to different reference scanning angle ranges. For example, three prior images of the subject may be obtained. The reference scanning angle ranges corresponding to the reference data of the three prior images may be in ranges of, for example, 90°-270°, 60°-300°, or 0°-360°, respectively. In this case, the plurality of prior images may have different temporal resolutions.

In some embodiments, the plurality of prior images may have different characteristics. For example, if the subject is the heart of a patient, three prior images A, B, and C may be obtained. A first reference angle corresponding to the prior image A may be properly set such that regions in the prior image A corresponding to myocardium tissue of the heart may have better image quality. A second reference angle corresponding to the prior image B may be properly set such that regions in the prior image B corresponding to coronary arteries of the heart may have better image quality. A third reference angle corresponding to the prior image C may be properly set such that the entire prior image C may have better global image quality.

During the reconstruction of the target image of the subject, a restriction factor A corresponding to the prior images A and a restriction factor B corresponding to the prior images B may be determined. In some embodiments, the restriction factor may be a map. In some embodiments, the restriction factor A and the restriction factor B may be matrices. Restriction elements of the restriction factor A and the restriction factor B may be configured such that regions with better image quality in the prior image A and the prior image B may supplement corresponding regions of the target image. For example, restriction elements of the restriction factor A for regions in the prior image A corresponding to the myocardium tissue of the heart may be set as the primary restriction factor. Restriction elements of the restriction factor B for regions in the prior image B corresponding to the coronary arteries of the heart may also be set as the primary restriction factor. A restriction factor C corresponding to the prior image C may be set as a global coefficient (e.g., the primary restriction factor). In this case, the entire prior image may be applied in the reconstruction of the target image.

In 903, the processing device 140 (e.g., the processor 210, the restriction factor determination module 410) may determine a restriction factor for each of the plurality of prior images based on the scanning data. Since the prior image of the subject corresponds to a larger reference scanning angle range exceeds the scanning angle range corresponding to the scanning data, the prior image may have a lower time resolution. The restriction factor may modulate restriction of the prior image in the reconstruction of the target image. In some embodiments, the operation 903 may be similar to or the same as the operation 503 of the process 500 in FIG. 5, and will not be repeated here.

In 905, the processing device 140 (e.g., the processor 210, the objective function determination module 430) may determine an objective function based on the restriction factors.

In some embodiments, the target image of the subject may be reconstructed based on the scanning data and the plurality of prior images according to an iterative reconstruction algorithm (e.g., a statistical reconstruction algorithm). The target image may be reconstructed in an iterative process including a plurality of iterations according to an objective function. In some embodiments, the objective function may be expressed as Formula (5):

$$\min_{X \geq 0} \|AX - Y\|_W^2 + \beta R(X) + \alpha_1 R(X - X_{prior1}) + \ldots + \alpha_n R(X - X_{priorn}), \quad (5)$$

where $\alpha_1$ through $\alpha_n$ denote restriction factors for the plurality of prior images, n denotes a natural number greater than 1, $X_{prior1}$ denotes reference data corresponding to a first prior image, and $X_{priorn}$ denotes reference data corresponding to an n-th prior image.

In 907, the processing device 140 (e.g., the processor 210, the reconstruction module 440) may reconstruct, using the objective function, a target image of the subject based on the scanning data and the plurality of prior images.

In some embodiments, during the plurality of iterations, a function value of the objective function may be assessed until the target image is obtained. In some embodiments, the scanning data may be further processed by performing various processing operations, such as air correction, convolution, back projection, etc. The primary image may be reconstructed based on the processed scanning data. In the plurality of iterations, grey values of elements of the primary image may be updated according to the objective function. In some embodiments, the operation 907 may be similar to or the same as the operation 507 of the process 500 in FIG. 5, and will not be repeated here.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one storage device including a set of instructions; and
   at least one processor configured to communicate with the at least one storage device, wherein when executing the set of instructions, the at least one processor is configured to direct the system to perform operations including:
      obtaining scanning data and at least one prior image of a subject;
      determining a restriction factor for each prior image of the at least one prior image based on the scanning data, the restriction factor of the each prior image relating to a motion of the subject corresponding to the scanning data;
      determining an objective function based on the restriction factor; and
      reconstructing, using the objective function, a target image of the subject based on the scanning data and the at least one prior image, wherein the at least one prior image of the subject includes two or more prior images, the two or more prior images are reconstructed based on reference data corresponding to different reference scanning angle ranges, and the two or more prior images correspond to different restriction factors.

2. The system of claim 1, wherein
   each of the at least one prior image is acquired from one first scanning angle range of a computed tomography (CT) scanner,
   the scanning data is acquired from a second scanning angle range of the CT scanner, and
   at least one of the at least one first scanning angle range exceeds the second scanning angle range.

3. The system of claim 1, wherein the determining a restriction factor for each prior image of the at least one prior image based on the scanning data includes:
   generating a primary image of the subject based on the scanning data;
   determining a mask matrix based on the primary image; and
   determining the restriction factor for the each prior image of the at least one prior image based on the mask matrix.

4. The system of claim 3, wherein the determining a mask matrix based on the primary image includes:
   determining at least one first region and at least one second region by segmenting the primary image, the at least one first region and the at least one second region forming the subject;
   identifying, in the at least one second region, at least one transition region;
   obtaining a primary mask matrix, wherein the primary mask matrix includes a plurality of mask elements, and each of the plurality of mask elements corresponds to at least one pixel or voxel of the primary image;
   updating the primary mask matrix by a process including:
      assigning first values to mask elements of the primary mask matrix that correspond to the at least one first region of the primary image;
      assigning second values to mask elements of the primary mask matrix that correspond to a remaining portion of the at least one second region other than the at least one transition region of the primary image; and
      assigning third values to mask elements of the primary mask matrix that correspond to the at least one transition region of the primary image; and
   designating the updated primary mask matrix as the mask matrix.

5. The system of claim 4, wherein the first values, the second values, and the third values range from 0 to 1.

6. The system of claim 4, wherein
   the at least one first region corresponds to a first motion degree,
   the at least one second region corresponds to a second motion degree,
   the at least one transition region corresponds to a third motion degree, and
   both the first motion degree and the third motion degree exceed the second motion degree.

7. The system of claim 1, wherein the restriction factor for one of the at least one prior image includes a plurality of restriction elements, each of the plurality of restriction elements corresponding to at least one pixel or voxel of the prior image.

8. The system of claim 1, wherein the determining a restriction factor for each prior image of the at least one prior image based on the scanning data includes:
obtaining second scanning data of the subject;
determining motion characteristics of the subject based on the first scanning data and the second scanning data; and
determining the restriction factor for the each prior image of the at least one prior image based on the motion characteristics of the subject.

9. The system of claim 8, wherein
the scanning data corresponds to a first motion phase of the motion of the subject,
the second scanning data corresponds to a second motion phase of the motion of the subject, and
the first motion phase and the second motion phase are different and consecutive to each other.

10. The system of claim 8, wherein the motion characteristics of the subject is represented by a motion vector field of the subject.

11. The system of claim 1, wherein
the at least one prior image of the subject includes a first prior image of a first temporal resolution and a second prior image of a second temporal resolution, and
the first temporal resolution is different from the second temporal resolution.

12. A method implemented on a computing device having a processor and a computer-readable storage device, the method comprising:
obtaining scanning data and at least one prior image of a subject;
determining a restriction factor for each prior image of the at least one prior image based on the scanning data, the restriction factor of the each prior image relating to a motion of the subject corresponding to the scanning data;
determining an objective function based on the restriction factor; and
reconstructing, using the objective function, a target image of the subject based on the scanning data and the at least one prior image, wherein the at least one prior image of the subject includes two or more prior images, the two or more prior images are reconstructed based on reference data corresponding to different reference scanning angle ranges, and the two or more prior images correspond to different restriction factors.

13. The method of claim 12, wherein
each of the at least one prior image is acquired from one first scanning angle range of a computed tomography (CT) scanner,
the scanning data is acquired from a second scanning angle range of the CT scanner, and
at least one of the at least one first scanning angle range exceeds the second scanning angle range.

14. The method of claim 12, wherein the determining a restriction factor for each prior image of the at least one prior image based on the scanning data includes:
generating a primary image of the subject based on the scanning data;
determining a mask matrix based on the primary image; and
determining the restriction factor for the each prior image of the at least one prior image based on the mask matrix.

15. The method of claim 12, wherein the determining a mask matrix based on the primary image includes:
determining at least one first region and at least one second region by segmenting the primary image, the at least one first region and the at least one second region forming the subject;
identifying, in the at least one second region, at least one transition region;
obtaining a primary mask matrix, wherein the primary mask matrix includes a plurality of mask elements, and each of the plurality of mask elements corresponds to at least one pixel or voxel of the primary image;
updating the primary mask matrix by a process including:
assigning first values to mask elements of the primary mask matrix that correspond to the at least one first region of the primary image;
assigning second values to mask elements of the primary mask matrix that correspond to a remaining portion of the at least one second region other than the at least one transition region of the primary image; and
assigning third values to mask elements of the primary mask matrix that correspond to the at least one transition region of the primary image; and
designating the updated primary mask matrix as the mask matrix.

16. The method of claim 15, wherein
the at least one first region corresponds to a first motion degree,
the at least one second region corresponds to a second motion degree,
the at least one transition region corresponds to a third motion degree, and
both the first motion degree and the third motion degree exceed the second motion degree.

17. The method of claim 12, wherein the determining a restriction factor for each prior image of the at least one prior image based on the scanning data includes:
obtaining second scanning data of the subject;
determining motion characteristics of the subject based on the first scanning data and the second scanning data; and
determining the restriction factor for the each prior image of the at least one prior image based on the motion characteristics of the subject.

18. The method of claim 17, wherein
the scanning data corresponds to a first motion phase of the motion of the subject,
the second scanning data corresponds to a second motion phase of the motion of the subject, and
the first motion phase and the second motion phase are different and consecutive to each other.

19. The method of claim 12, wherein
the at least one prior image of the subject includes a first prior image of a first temporal resolution and a second prior image of a second temporal resolution, and
the first temporal resolution is different from the second temporal resolution.

20. A non-transitory computer-readable storage medium including instructions that, when accessed by at least one processor of a method, cause the system to perform a method, the method comprising:
obtaining scanning data and at least one prior image of a subject;
determining a restriction factor for each prior image of the at least one prior image based on the scanning data, the restriction factor of the each prior image relating to a motion of the subject corresponding to the scanning data;

determining an objective function based on the restriction factor; and reconstructing, using the objective function, a target image of the subject based on the scanning data and the at least one prior image, wherein the at least one prior image of the subject includes two or more prior images, the two or more prior images are reconstructed based on reference data corresponding to different reference scanning angle ranges, and the two or more prior images correspond to different restriction factors.

* * * * *